United States Patent
Mohr et al.

(10) Patent No.: US 7,123,458 B2
(45) Date of Patent: Oct. 17, 2006

(54) METHOD AND CIRCUIT ARRANGEMENT FOR PROTECTING AN ELECTRIC MOTOR FROM AN OVERLOAD

(75) Inventors: Thomas Mohr, Buehlertal (DE); Norbert Knab, Appenweier (DE); Albert Eisele, Achern (DE); Juergen Rapp, Waldbronn (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 10/467,329

(22) PCT Filed: Sep. 24, 2002

(86) PCT No.: PCT/DE02/03604

§ 371 (c)(1), (2), (4) Date: Apr. 28, 2004

(87) PCT Pub. No.: WO03/052921

PCT Pub. Date: Jun. 26, 2003

(65) Prior Publication Data

US 2004/0169968 A1    Sep. 2, 2004

(30) Foreign Application Priority Data

Dec. 18, 2001    (DE) ............................. 101 62 181

(51) Int. Cl.
*H02H 7/09* (2006.01)
*H02P 7/29* (2006.01)
*H03K 19/003* (2006.01)
*H03K 19/007* (2006.01)

(52) U.S. Cl. ........................ 361/33; 388/811; 326/9; 326/14

(58) Field of Classification Search ............... 361/33; 388/811; 326/9, 14
See application file for complete search history.

(56) References Cited

U.S. PATENT DOCUMENTS 5,142,474 A * 8/1992 Miyata et al. ............... 701/33
5,648,759 A * 7/1997 Miller et al. ................ 340/660
5,986,902 A * 11/1999 Brkovic et al. ............. 363/50
6,268,708 B1 * 7/2001 Kawada et al. ............. 318/430
6,278,597 B1 * 8/2001 Covi et al. .................. 361/91.1

FOREIGN PATENT DOCUMENTS

DE    19944194    *  3/2001

* cited by examiner

*Primary Examiner*—Chau N. Nguyen
*Assistant Examiner*—Scott Bauer
(74) *Attorney, Agent, or Firm*—Ronald E. Greigg

(57) ABSTRACT

A method and a circuit for protecting an electric motor and/or its trigger circuit against overload in the emergency-operation mode in a motor vehicle direct-current fan motor operated by means of pulse width modulation, in which the trigger circuit is designed as an emergency-operation controller, with a microcontroller preceding the motor end stage and with a comparator assembly for detecting overvoltages. Overload protection is assured at elevated battery voltage and at the same time when the emergency-operation controller is activated in response to malfunctions in the normal triggering of the electric motor. To that end, at least one overvoltage threshold ($U_{s1}$, $U_{s2}$) is defined; when it is exceeded, the power supplied to the motor is reduced or switched off.

20 Claims, 1 Drawing Sheet

METHOD AND CIRCUIT ARRANGEMENT FOR PROTECTING AN ELECTRIC MOTOR FROM AN OVERLOAD

CROSS-REFERENCE TO RELATED APPLICATIONS

This application is a 35 USC 371 application of PCT/DE 02/03604 filed on Sep. 24, 2002.

BACKGROUND OF THE INVENTION

1. Field of the Invention

The invention is directed to an improved method for protecting an electric motor and/or its trigger circuit against overload, and on a circuit arrangement for performing such a method.

2. Description of the Prior Art

German Patent Disclosure DE 199 44 194 A discloses an overload protector for an electronically commutable motor whose end stage can be triggered via an electronic control unit by means of PWM control signals and can be supplied with a supply voltage. A limitation to a maximal load with overload protection of the motor is attained by providing that as a function of the magnitude of the supply voltage and of the specified set-point value, for the PWM control signals at least from the time the rated voltage of the motor is exceeded, the pulse width of the pulse width modulated (PWM) control signals for the end stage is reduced to values that prevent an overload of the motor and of the electronic components by limiting the motor power. However, a circuit arrangement of this kind assures overload protection only as long as the triggering of the end stage by PWM signals does not itself have any malfunctions.

OBJECTS AND SUMMARY OF THE INVENTION

The object of the invention is to provide a method for protecting an electric motor and/or its triggering against overload, and a circuit arrangement suitable for performing such a method, with which even in the event of malfunctions in the trigger circuit itself, protection of the electric motor and its power supply against overload is assured. In particular, it is thus assured that in the case of so-called emergency operation of the motor, that is, when its regular trigger circuit has failed or been put out of operation, compensation for an excessive battery voltage and an overload on the drive mechanism caused by it is assured.

Features and refinements of the invention will become apparent from the description of the exemplary embodiment for protecting a direct-current fan motor of a motor vehicle having a 12-volt direct current supply to the on-board electrical system. The method serves to assure emergency operation for an electric motor, which in the case of a fan motor for motor vehicles must be assured on the one hand, yet on the other must not itself be allowed to cause damage. The focus is particularly on interrupting the trigger line of the radiator fan end stage, that is, on the proper reception of the trigger signals from the end stage, and on monitoring the supply voltage supplied, or in other words in the case of the motor vehicle, the battery voltage delivered via the ignition starting switch.

One advantageous method is embodied such that in the trigger circuit, at least one overvoltage threshold is defined, which when it is reached or exceeded leads to a reduction in the power supply to the motor, or the shutting off of the motor. Preferably, the method and the circuit arrangement are designed such that below a first overvoltage threshold, a power corresponding to the range between 30% and 100% of the battery voltage is supplied to the motor. Until the first overvoltage threshold is reached, a power corresponding to the full battery voltage can be applied to the motor, but selectively, the power can also be already reduced, for instance to half the power value, upon activation of the emergency-operation controller or upon reaching the battery voltage. The full battery voltage, in pulse width modulation, corresponds to triggering at a 100% duty cycle, while at half the battery voltage, the duty cycle is 50%. Preferably, however, two overvoltage thresholds are specified, and below the first threshold, the electric motor is supplied with a power corresponding to the full battery voltage, while in the range between the first threshold and the second threshold, a power reduced preferably to 50% of the battery voltage is fed into the motor. When the second overvoltage threshold is reached, the motor is then switched off, to prevent an overload on the motor itself and/or on its end stage.

A voltage monitoring circuit that is part of the motor triggering with regulated emergency operation according to the invention has a comparator assembly with a number of comparators corresponding to the number of overvoltage thresholds; the comparators are supplied on the one hand with reference voltages corresponding to the particular defined overvoltage thresholds and on the other hand as a tripping variable, a reference value corresponding to the actual battery voltage. Thus in an especially simple and secure way, the prevention of an overload on the drive mechanism is assured, since the control is based on the definitive variables for the overload themselves.

An especially suitable circuit arrangement for protecting an electric motor and/or its triggering against overload in the emergency-operation mode, in particular for protecting a direct-current fan motor of a motor vehicle, uses a motor end stage with pulse-width modulated triggering and is distinguished in that for protection against overload in the emergency-operation mode, in which the supplied power can no longer be assured by the PWM trigger circuit that is operative in normal operation, the electric motor is additionally provided with a microcontroller, which precedes the end stage and has an associated comparator assembly for monitoring the supply voltage. This emergency-operation controller becomes operative particularly in the event of an interruption or in the absence of a feed-in of the set-point value signal of the pulse width modulation and/or of the supply voltage switched to the motor end stage, because now the motor end stage is supplied with a control voltage corresponding to one or more overvoltage thresholds, which are monitored and indicated to the microcontroller.

BRIEF DESCRIPTION OF THE DRAWINGS

Further details and advantageous features of the invention will become apparent from the description of the exemplary embodiment contained herein below, taken in conjunction with the drawings, in which.

DESCRIPTION OF THE PREFERRED EMBODIMENTS

Figure 1:
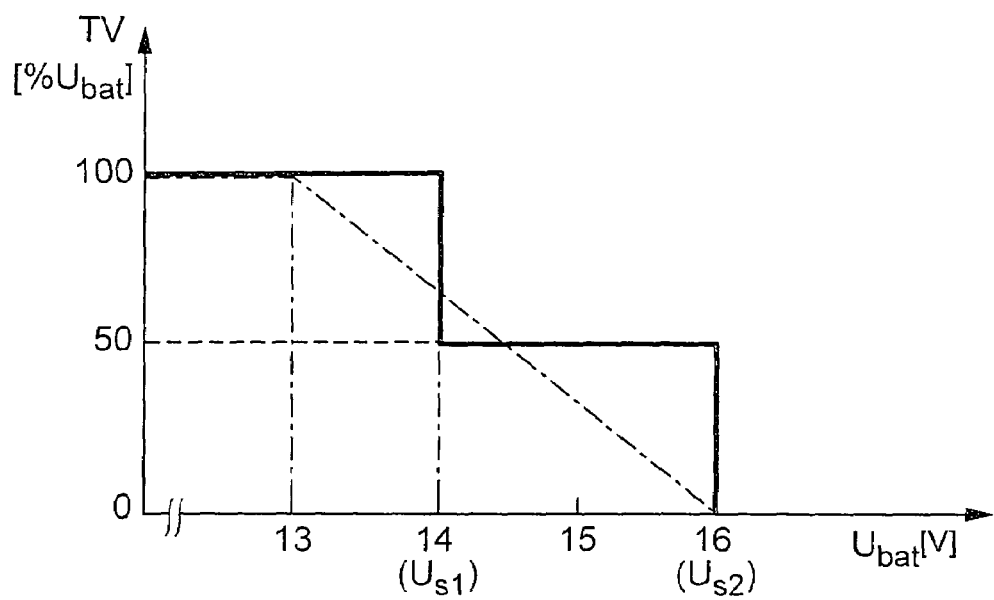
FIG. 1 shows the course of the duty cycle TV of the voltage delivered to the electric motor, as a function of the variable battery voltage $U_{bat}$.

In FIG. 1, the duty cycle TV of the pulsed supply voltage is plotted as a percentage over the battery voltage $U_{bat}$. To simplify the drawing, only the values for 50% and 100% are shown for the duty cycle TV. For the battery voltage, values are marked from 13 V to 16 V. A battery voltage of 13 V corresponds to the normal supply voltage; a first overvoltage threshold $U_{s1}$ is defined at 14 V, and a second overvoltage threshold $U_{s2}$ is defined at 16 V.

In the drawing in FIG. 1, various courses of the duty cycle TV, which corresponds to the mean value of the supplied voltage to the drive mechanism, are shown. A dot-dashed line represents the usual course of the pulse width modulation; below the normal battery voltage of 13 V, the full voltage is applied in accordance with a duty cycle of 100%, while above this value the duty cycle is reduced—linearly, in the case illustrated—and the value of zero is reached at a battery voltage of 16 V. This kind of control of the supply voltage is described in DE 199 44 194 A above.

In the emergency-operation mode, the case in which the above-described regulation of the supply voltage, shown in dot-dashed lines in FIG. 1, fails must be taken into account in particular. Since in the normal situation the electric motor is designed for a supply voltage of 13 V, if a supply voltage of 16 V were applied in the event of failure of the regulation, the motor and its end stage would be overloaded in every case, which is prevented in the control according to the invention here.

In FIG. 1, a solid line represents a voltage course in which, after the failure of the PWM triggering up to a value of 14 V, the full battery voltage is applied to the motor. In the normal situation, this slight overload would still be tolerated without damage by a radiator fan motor for motor vehicles and by its end stage. After the first overvoltage threshold $U_{s1}$ of 14 V is reached, the duty cycle is then set back to 50%, so that now only half the battery voltage is applied to the motor. This still makes an adequate emergency-operation power to the motor possible. Not until the second overvoltage threshold $U_{s2}$ of 16 V is reached is the supply voltage then switched off.

A further alternative is represented in FIG. 1 by a dashed line. This illustrates the possibility of setting the supply voltage back to half directly upon the occurrence of the emergency-operation situation, corresponding to a duty cycle of 50%, and of maintaining that value until the shutoff at the second overvoltage threshold $U_{s2}$. It is certainly possible to provide still additional thresholds. For instance, it would be conceivable to define a first overvoltage threshold already at the rated value for the battery voltage of 13 V, and to reduce the voltage when this value is reached. It would fundamentally also be possible in the emergency-operation mode to perform a regulated reduction of the duty cycle TV, for instance corresponding to the course shown in dot-dashed lines for nonfaulty operation.

Figure 2:
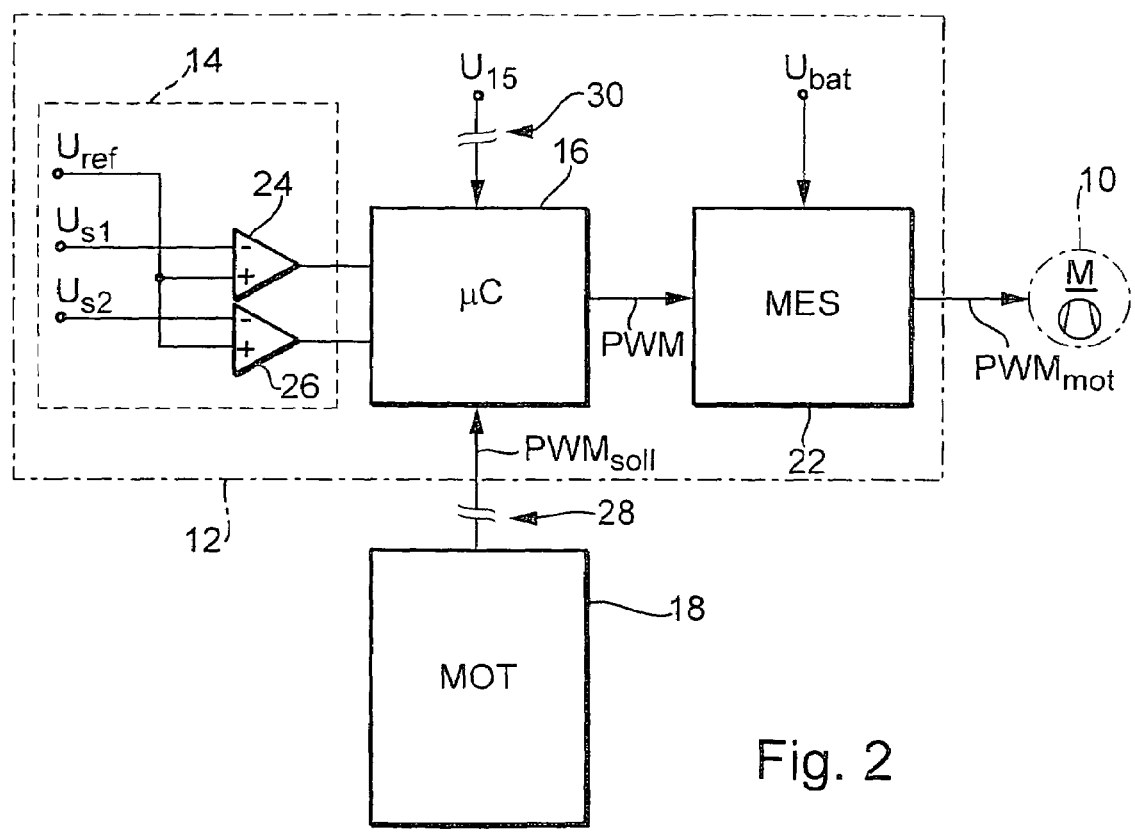
FIG. 2 shows a circuit arrangement of an overload protector of the invention for the emergency-operation mode of a radiator fan for a motor vehicle.

FIG. 2 shows a circuit arrangement for protecting a direct-current fan motor of a motor vehicle and its trigger circuit 12 against overload. The drawing shows an electric motor and fan, marked 10, which is supplied by the trigger circuit 12 with a pulse-width modulated voltage $PWM_{mot}$. The trigger circuit 12 essentially comprises a comparator assembly 14, a microcontroller 16, and a motor end stage 22. The triggering in the normal operating mode of the electric motor 10 is effected via a motor vehicle control unit 18, typically called a Motronic, which supplies the microcontroller 16 with the set-point value for the PWM. The microcontroller 16 is also connected to the output of the comparator assembly 14 and to the switched battery voltage $U_{15}$ downstream of the ignition switch. The output of the microcontroller 16 with the pulse-width modulated control signal PWM is connected to the motor end stage 22, which is also connected to the vehicle battery, not shown, and which from there receives the battery voltage $U_{bat}$. The pulse-width modulated supply voltage $PWM_{mot}$ is applied to the electric motor 10 at the output of the motor end stage 22.

In the exemplary embodiment, the comparator assembly 14 comprises two comparators 24 and 26, at each of whose noninverting inputs a reference value $U_{ref}$ derived from the actual battery voltage is applied. Each reference value is compared with the overvoltage thresholds $U_{s1}$ and $U_{s2}$, respectively, already explained in conjunction with FIG. 1, which for a 12-volt on-board electrical system of a motor vehicle are expediently defined at values of 14 V for $U_{s1}$ and 16 V for $U_{s2}$, as limit values for a normal battery voltage of 13 V as the supply voltage to the electric motor 10.

The output signal $PWM_{soll}$ of the Motronic 18, in particular, is monitored as a malfunction variable for the emergency-operation mode of the electric motor 10. For instance, if the communication between the Motronic 18 and the microcontroller 16 is interrupted, an overload can occur at the electric motor 10 or at its end stage 22, if at the same time, upon a malfunction in the pulse width modulation of the trigger signal, an excessive increase in the battery voltage $U_{bat}$ occurs.

Another reason for activating the emergency-operation controller can be interruption of the switched battery voltage $U_{15}$ downstream of the ignition switch of the motor vehicle; this malfunction can occur simultaneously with or separately from a malfunction in the trigger signal of the Motronic 18.

If a malfunction occurs, then a signal corresponding to a overvoltage threshold $U_{s1}$ of 14 V is present at the inverting input of the comparator 24 in the comparator assembly 14, while an input signal corresponding to the overvoltage threshold $U_{s2}$ of 16 V is present at the inverting input of the comparator 26. Both noninverting inputs of the comparators 24 and 26 are acted upon by a reference voltage $U_{ref}$, whose magnitude is determined by the actual battery voltage $U_{bat}$.

In an emergency-operation program represented by the solid line in FIG. 1, the comparator assembly 14 and with it the emergency-operation controller are inactive as long as the battery voltage does not exceed a value of 14 V corresponding to the threshold $U_{s1}$. Up to that time, the duty cycle TV is 100%, and the battery voltage is applied to its full extent to the electric motor 10 via the motor end stage 22. When the overvoltage threshold $U_{s1}$ of 14 V is reached, the duty cycle TV is lowered to a value of 50%, and half the battery voltage reaches the motor, until the overvoltage threshold $U_{s2}$ of 16 V is reached, and the supply of current to the electric motor 10 is switched off. The same is correspondingly true for the other courses shown in FIG. 1 for a battery voltage that is reduced in the emergency-operation mode. In the case of the dashed line, immediately upon the occurrence of a malfunction at the malfunctioning sites 28 and/or 30, the supply voltage is halved by a reduction in the duty cycle to 50%, and it continues to be applied at that level to the electric motor 10 until the overvoltage threshold $U_{s2}$ of 16 V is reached and the motor is switched off.

As represented by the dot-dashed line in FIG. 1, a regulated supply can also be assured in the emergency-operation mode. In addition, additional overvoltage thresholds can be defined, and intermediate stages in the reduction in the supply voltage can be achieved. The monitoring function in the trigger circuit 12 by the microcontroller 16 is not limited to complete failure of the $PWM_{soll}$ signal or of the switched supply voltage $U_{15}$; instead, and in particular, monitoring of the variables $PWM_{soll}$ and $U_{15}$ for plausibility is also done in the microcontroller 16. For the variables $U_{15}$ and $PWM_{soll}$, limit values of 10% and 90%, for instance, respectively, can be defined, which when they are undershot or exceeded indicate failure.

The pulse frequency of the pulse width modulation of this kind of trigger circuit 12 is typically in the range between 100 Hz and 300 Hz, and this pulse frequency is also monitored; once again, slight fluctuations are not identified as a malfunction. Finally, instead of the Motronic 18, any other closed- or open-loop control unit can be used for the pulse width modulation, and in particular can also be integrated with the microcontroller 16. What is essential is that if the normal closed- or open-loop control fails with a simultaneous occurrence of an elevated battery voltage, the electric motor 10 or its end stage 22 will not be overloaded; instead, in that case the emergency-operation controller intervenes and maintains further operation of the electric motor 10 within specified limits.

Thus the circuit arrangement of the invention makes an internal voltage compensation within the motor trigger circuit possible if the motor control unit, for instance in the form of the Motronic 18, normally located upstream of the trigger circuit fails; this control unit itself, if there is an interruption in the trigger line in the event of an elevated battery voltage, cannot prevent an overload.

The foregoing relates to preferred exemplary embodiments of the invention, it being understood that other variants and embodiments thereof are possible within the spirit and scope of the invention, the latter being defined by the appended claims.

The invention claimed is:

1. A method of activation of an emergency operation controller for protecting an electric motor (10) and/or its trigger circuit (12) against overload, wherein the electric motor is assigned a motor end stage for pulse-width modulated control (PWM) of the power supplied and is also assigned a controller for limiting the motor power on the occurrence of an elevated supply voltage, the method comprising providing an overload protection which becomes operative in emergency operation of the electric motor (10) by activation of an emergency operation controller (14, 16) upon the occurrence of a malfunction (28, 30) in the triggering circuit (12) of the motor end stage, and supplying electric motor (10) with a defined emergency-operation power, which below a first overvoltage threshold ($U_{s1}$) of the supply voltage has a specified value or course and is reduced or switched off if one or more overvoltage thresholds ($U_{s1}$ $U_{s2}$) are exceeded.

2. The method of claim 1, comprising supplying the electric motor (10) with a power corresponding to the range between 30% and 100% of the battery voltage ($U_{bat}$), below the first overvoltage threshold ($U_{s1}$), and in particular a power corresponding to the full battery voltage ($U_{bat}$).

3. The method of claim 2, further comprising specifying two overvoltage thresholds ($U_{s1}$, $U_{s2}$), and between the first threshold ($U_{s1}$) and the second threshold ($U_{s2}$), supplying the electric motor (10) with a power corresponding to the range between 30% and 70% of the battery voltage ($U_{bat}$), and preferably a power corresponding to half the battery voltage.

4. The method of claim 2, further comprising switching the electric motor (10) off when the second overvoltage threshold ($U_{s2}$) is reached.

5. The method of claim 2, wherein the electric motor circuit is a 12-volt on-board electrical system of a motor vehicle, and wherein the first overvoltage threshold ($U_{s1}$) is fixed at a value of 14 V.

6. The method of claim 2, wherein the electric motor circuit is a 12-volt on-board electrical system of a motor vehicle, and wherein the second overvoltage threshold ($U_{s2}$) is fixed at a value of 16 V.

7. The method of claim 1, further comprising specifying two overvoltage thresholds ($U_{s1}$, $U_{s2}$), and between the first threshold ($U_{s1}$) and the second threshold ($U_{s2}$), supplying the electric motor (10) with a power corresponding to the range between 30% and 70% of the battery voltage ($U_{bat}$), and preferably a power corresponding to half the battery voltage.

8. The method of claim 7, further comprising switching the electric motor (10) off when the second overvoltage threshold ($U_{s2}$) is reached.

9. The method of claim 7, wherein the electric motor circuit is a 12-volt on-board electrical system of a motor vehicle, and wherein the first overvoltage threshold ($U_{s1}$) is fixed at a value of 14 V.

10. The method of claim 7, wherein the electric motor circuit is a 12-volt onboard electrical system of a motor vehicle, and wherein the second overvoltage threshold ($U_{s2}$) is fixed at a value of 16 V.

11. The method of claim 1, further comprising switching the electric motor (10) off when the second overvoltage threshold ($U_{s2}$) is reached.

12. The method of claim 11, wherein the electric motor circuit is a 12-volt on-board electrical system of a motor vehicle, and wherein the first overvoltage threshold ($U_{s1}$) is fixed at a value of 14 V.

13. The method of claim 11, wherein the electric motor circuit is a 12-volt on-board electrical system of a motor vehicle, and wherein the second overvoltage threshold ($U_{s2}$) is fixed at a value of 16 V.

14. The method of claim 1, wherein the electric motor circuit is a 12-volt onboard electrical system of a motor vehicle, and wherein the first overvoltage threshold ($U_{s1}$) is fixed at a value of 14 V.

15. The method of claim 1, wherein the electric motor circuit is a 12-volt on-board electrical system of a motor vehicle, and wherein the second overvoltage threshold ($U_{s2}$) is fixed at a value of 16 V.

16. A method of activation of an emergency operation controller for protecting an electric motor (10) and/or its trigger circuit (12) against overload, wherein the electric motor is assigned a motor end stage for pulse-width modulated control (PWM) of the power supplied and is also assigned a controller for limiting the motor power on the occurrence of an elevated supply voltage, the method comprising providing an overload protection which becomes operative in emergency operation of the electric motor (10) by activation of an emergency operation controller (14, 16) upon the occurrence of a malfunction (28, 30) in the triggering circuit (12) of the motor end stage, and supplying electric motor (10) with a defined emergency-operation power, which below a first overvoltage threshold $U_{s1}$ of the supply voltage has a specified value or course and is reduced or switched off if one or more overvoltage thresholds ($U_{s1}$ $U_{s2}$) are exceeded, further comprising regulating the power of the electric motor (10) in the emergency-operation mode by means of a voltage monitoring circuit with a comparator assembly (14), to which a reference voltage ($U_{ref}$) corresponding to the battery voltage ($U_{bat}$) is supplied as a reference value for the overvoltage thresholds ($U_{s1}$, $U_{s2}$).

17. In a circuit arrangement for protecting an electric motor and/or its trigger circuit (12) against overload, the circuit arrangement comprising a motor end stage for pulse-width modulated control (PWM) of the power supplied to the electric motor, a controller for limiting the motor power on the occurrence of an elevated supply voltage, the improvement wherein, for the overload protection in the emergency-operation mode of the electric motor (10), the trigger circuit (12) is embodied as an emergency-operation controller (14, 16, 22), which in addition to a PWM set-point value transducer (18) and the motor end stage (22) has a microcontroller (16), which precedes the motor end stage and which upon an interruption or a defective input of the set-point value signal of the pulse width modulation ($PWM_{soll}$) and/or of a switched supply voltage ($U_{15}$) supplies a control voltage (PWM) to the motor end stage (22), corresponding to the specification of at least one overvoltage threshold ($U_{s1}$, $U_{s2}$) to the microcontroller.

18. The circuit arrangement of claim 17, wherein the emergency-operation controller (14, 16, 22) comprises a comparator assembly (14), to which on the one hand a reference voltage ($U_{ref}$) corresponding to the battery voltage ($U_{bat}$) and on the other, as a comparison value, at least one overvoltage threshold ($U_{s1}$, $U_{s2}$) above the normal battery voltage ($U_{bat}$) are specified.

19. The circuit arrangement of claim 18, wherein the electric motor is employed in a 12-volt on-board electrical system of a motor vehicle, and wherein the comparator assembly (14) has two comparators (24, 26), to which on the one hand a reference value ($U_{ref}$) derived from the actual battery voltage ($U_{bat}$) and on the other overvoltage thresholds of approximately 14 V ($U_{s1}$) and approximately 16 V ($U_{s2}$), respectively, above the normal battery voltage ($U_{bat}$) of approximately 13 V, are specified.

20. The circuit arrangement of claim 19, wherein the electric motor is employed in a 12-volt on-board electrical system of a motor vehicle, and wherein the comparator assembly (14) has two comparators (24, 26), to which on the one hand a reference value ($U_{ref}$) derived from the actual battery voltage ($U_{bat}$) and on the other overvoltage thresholds of approximately 14 V ($U_{s1}$) and approximately 16 V ($U_{s2}$), respectively, above the normal battery voltage ($U_{bat}$) of approximately 13 V, are specified.

* * * * *